United States Patent
Sugatoor et al.

(10) Patent No.: US 10,117,048 B2
(45) Date of Patent: Oct. 30, 2018

(54) CLIENT BOUNDARY LOCATION

(71) Applicant: Aruba Networks, Inc., Sunnyvale, CA (US)

(72) Inventors: Manaswini Lakshmikanth Sugatoor, Bangalore (IN); Gopal Agarwal, Bangalore (IN); Manas Sharma, Bangalore (IN); Sachin Shamrao Sanap, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 75 days.

(21) Appl. No.: 15/336,591

(22) Filed: Oct. 27, 2016

(65) Prior Publication Data

US 2018/0124556 A1    May 3, 2018

(51) Int. Cl.
| | |
|---|---|
| *H04W 24/00* | (2009.01) |
| *H04W 4/02* | (2018.01) |
| *H04W 4/021* | (2018.01) |
| *H04W 4/029* | (2018.01) |
| *G01S 5/02* | (2010.01) |

(52) U.S. Cl.
CPC ............... *H04W 4/02* (2013.01); *G01S 5/02* (2013.01); *H04W 4/021* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 2004/0095276 A1 | 5/2004 | Krumm et al. | |
| 2011/0178705 A1 | 7/2011 | Pakzad et al. | |
| 2011/0256881 A1* | 10/2011 | Huang | G01S 5/0257 455/456.1 |
| 2014/0156180 A1 | 6/2014 | Marti et al. | |
| 2016/0195400 A1 | 7/2016 | Young et al. | |

FOREIGN PATENT DOCUMENTS

WO    WO-2013112376 A1    8/2013

OTHER PUBLICATIONS

IEEE Computer Society, "Part 11: Wireless LAN Medium Access Control (MAC) and Physical Layer (PHY) Specifications; IEEE Std 802.11-2012", Mar. 29, 2012, 63 pages, IEEE, USA.
Wi-Fi Alliance, "Wi-Fi Peer-to-Peer (P2F) Technical Spec. V. 1.5", Aug. 4, 2014, 13 pages, WiFi Alliance, USA.
Wi-Fi Alliance, "Wi-Fi Certified Wi-Fi Direct: Personal, portable Wi-Fi to connect devices anywhere, anytime", Sep. 2014, 8 pages, WiFi Alliance USA.

(Continued)

*Primary Examiner* — Suhail Khan
(74) *Attorney, Agent, or Firm* — Brooks, Cameron & Huebsch, PLLC

(57) ABSTRACT

Example implementations relate to client boundary location. For example, a non-transitory computer readable medium storing instructions executable by a processing resource to cause a computer to estimate a location of a client within a first boundary; determine whether there is a pathway between the first boundary and a second boundary for the client to move; and indicate whether the client is in the first boundary or the second boundary based on the determination of the pathway and the estimated location of the client.

15 Claims, 4 Drawing Sheets

(56) References Cited

OTHER PUBLICATIONS

IEEE Computer Society, "IEEE Standard for Air Interface for Broadband Wireless Access Systems; IEE Std 802.16-2012", Aug. 17, 2012, 3 pages, IEEE, USA.
Bluetooth, "Specification of the Bluetooth System", Dec. 2, 2014, 3 pages, Covered Core Package version 4.2, Bluetooth SIG Inc., USA.
IEEE Computer Society, "IEEE Standard for Local and Metropolitan Area Networks: Overview and Architecture; IEEE Std 802-2014", Jun. 12, 2014, 18 pages, IEEE, USA.
Wikipedia, https://en.wikipedia.org/wiki/Internet_Protocol, "Internet Protocol", Jan. 1, 2015, 6 pages, Wikipedia, USA.
USB Technology, http://www.usb.org/developers/docs/, "USB 3.1 Specification" Jul. 26, 2013, 37 pages, USB Implementers Forum Inc, USA.
Wikipedia, https://en.wikipedia.org/wiki/Asynchronous_Transfer_Mode, "Asynchronous Transfer Mode", Dec. 31, 2014, 11 pages, Wikipedia, USA.
Widyawan et al: "A novel backtracking particle filter for pattern matching indoor localization". Proceedings of the ACM International Workshop on Mobile Entity Localization and Tracking in GPS-Less Environments, MELT 2008, San Francisco, California, USA, Sep. 19, 2008, ACM, New York, NY, Sep. 19, 2008, pp. 79-84. XP058098052, DOI: 10.1145/1410012.1410031 ISBN: 978-1-60558-189-7.

* cited by examiner

CLIENT BOUNDARY LOCATION

BACKGROUND

A network device, referred to as an access point ("AP"), can be a wireless networking device used to allow Wi-Fi compliant devices to connect to a wired network. An AP can connect to a router via the wired network as a standalone device. APs can be located within a defined geographical boundary. The geographical boundary can be referred to as a geofence.

DETAILED DESCRIPTION

Figure 1:
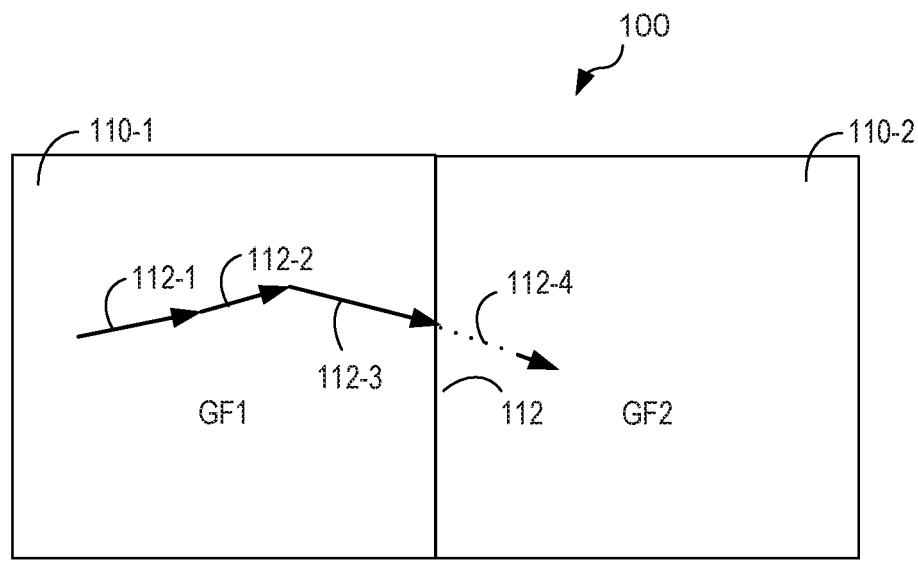
FIG. 1 illustrates an example network for client boundary location consistent with the present disclosure.

Wireless networks can provide various types of communication to multiple users wirelessly through the use of electromagnetic waves. As a result, various types of communication may be provided to multiple users without cables, wires, or other physical electric conductors to couple devices in the wireless network. Examples of the various types of communication that may be provided by wireless networks include voice communication, data communication, multimedia services, etc.

An example of a wireless network is a wireless local area network (WLAN). As used herein, 'wireless local area network' (WLAN) generally refers to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network. WLANs may include multiple stations (STAs) and/or network devices referred to as access points (APs) that may communicate over a plurality of wireless channels. An STA is a device that has the capability to use the Institute of Electrical and Electronics Engineers (IEEE) 802.11 protocol. Examples of STAs include smart phones, laptops, physical non-virtualized computing devices, personal digital assistants, etc. In some examples, a STA may be a device that contains an IEEE 802.11-conformant media access control (MAC) and physical layer (PHY) interface to a wireless medium (WM).

Wireless networks such as WLANs can use one or more wireless communication technologies, for example, orthogonal frequency division multiplexing (OFDM). In an OFDM based wireless network, a data stream is split into multiple data substreams. Such data substreams may be sent over different OFDM subcarriers, which can be referred to as tones or frequency tones. Some wireless networks may use a single-in-single-out (SISO) communication approach, where each STA and/or AP uses a single antenna. Other wireless networks may use a multiple-in-multiple-out (MIMO) communication approach, where a STA and/or AP uses multiple transmit antennas and multiple receive antennas. WLANs such as those defined in the IEEE wireless communications standards, e.g., IEEE 802.11a, IEEE 802.11n, IEEE 802.11ac, etc. can use OFDM to transmit and receive signals. Moreover, WLANs, such as those based on the IEEE 802.11n or IEEE 802.11ac standards, can use OFDM and MIMO.

As used herein, an AP is a networking hardware device that allows a wireless-compliant device (e.g., a STA) to connect to a network. As used herein, 'access point' (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

A network device such as an access point (AP) may provide connectivity with a network such as the internet to the STAs. As used herein, 'network device' generally includes a device that is adapted to transmit and/or receive signaling and to process information within such signaling such as a station (e.g., any data processing equipment such as a computer, cellular phone, personal digital assistant, table devices, etc.), an access point, data transfer devices (such as network switches, routers, controllers, etc.) or the like. As used herein, AP generally refers to receiving points for any known or convenient wireless technology which may later become known. Specifically, the term AP is not intended to be limited to Institute of Electrical and Electronics Engineers (IEEE) 802.11-based APs. APs generally function as an electronic device that is adapted to allow wireless devices to connect to a wired network via various communications standards. An access point (AP) can be coupled to a wired network and provide wireless access to a number of clients. An AP can be managed and/or monitored by a controller that controls automatic adjustments of power, channels, authentication, and/or security. A common public application of an AP can be referred to as a hotspot where a wireless client can connect to the internet independent of being aware of which particular network the wireless client is attached to. This can be beneficial for staying continually connected to the internet while moving around from location to location.

A client (such as a network device, an AP, a remote device, etc.) can be located within a particular geographically defined boundary referred to as a geofence. The client can be located using a number of methods. The number of methods can include triangulation and/or a single AP location. The client can move within the first geofence. The client can move from being within the first geofence to being in a second geofence. The client can travel through a pathway between the first geofence to move to being within the second geofence. In some examples, it can be difficult to locate the client as the client can be estimated to be moving toward the second geofence, and therefore located within the second geofence, even when the client has only moved to a boundary limit of the first geofence. In these particular situations, it can be beneficial to be aware of where geofence boundary limits, geofence pathways, etc., are located to determine whether the client has actually passed from one geofence to another.

FIG. 1 illustrates an example network for client boundary location consistent with the present disclosure. As illustrated in FIG. 1, the network 100 may include a first geofence "GF1" 110-1 and a second geofence "GF2" 110-2. A geofence refers to a geographical boundary that is contained within a number of boundaries composing each side of the geographical boundary. For example, GF1 110-1 and GF2 110-2 each have four sides. In this example, a boundary intersection 112 is a boundary between the GF1 110-1 and the GF2 110-2.

A location of a client (e.g., a user, a computing device, an access point, etc.) within a geographical boundary (e.g., a geofence) can be determined. For example, a client can be located within the GF1 110-1. In some examples, a client can be located on a floor map and an (x,y) coordinate indicating where on the floor map the client is located. A first movement 112-1 of the client can be determined, as illustrated by the arrow labeled 112-1. A second movement 112-2 can be determined as beginning at a location where the first movement 112-1 ended and continuing to an end of the second movement 112-2. A third movement 112-3 can be determined as beginning at a location where the second movement 112-2 ended and continuing to an end of the third movement 112-3. In some examples, a current location of a client is estimated based on where movement of the client was last detected.

In some examples, a current location of the client is estimated based on a direction of movement and may indicate a location that the client is moving towards. For example, while partway through the third movement 112-3 of the client (e.g., halfway between the beginning of the arrow 112-3 and the end of the arrow 112-3), the client may be determined to be at the end of the third movement 112-3 (e.g., already located as if the third movement is completed). The client can be reported as located within an (x,y) or (x,y,z) coordinate continuously in order to monitor a client's location. In some examples, the client can be estimated as located in both the first boundary and the second boundary as the estimation is not able to determine which boundary the client is currently within.

Figure 3:
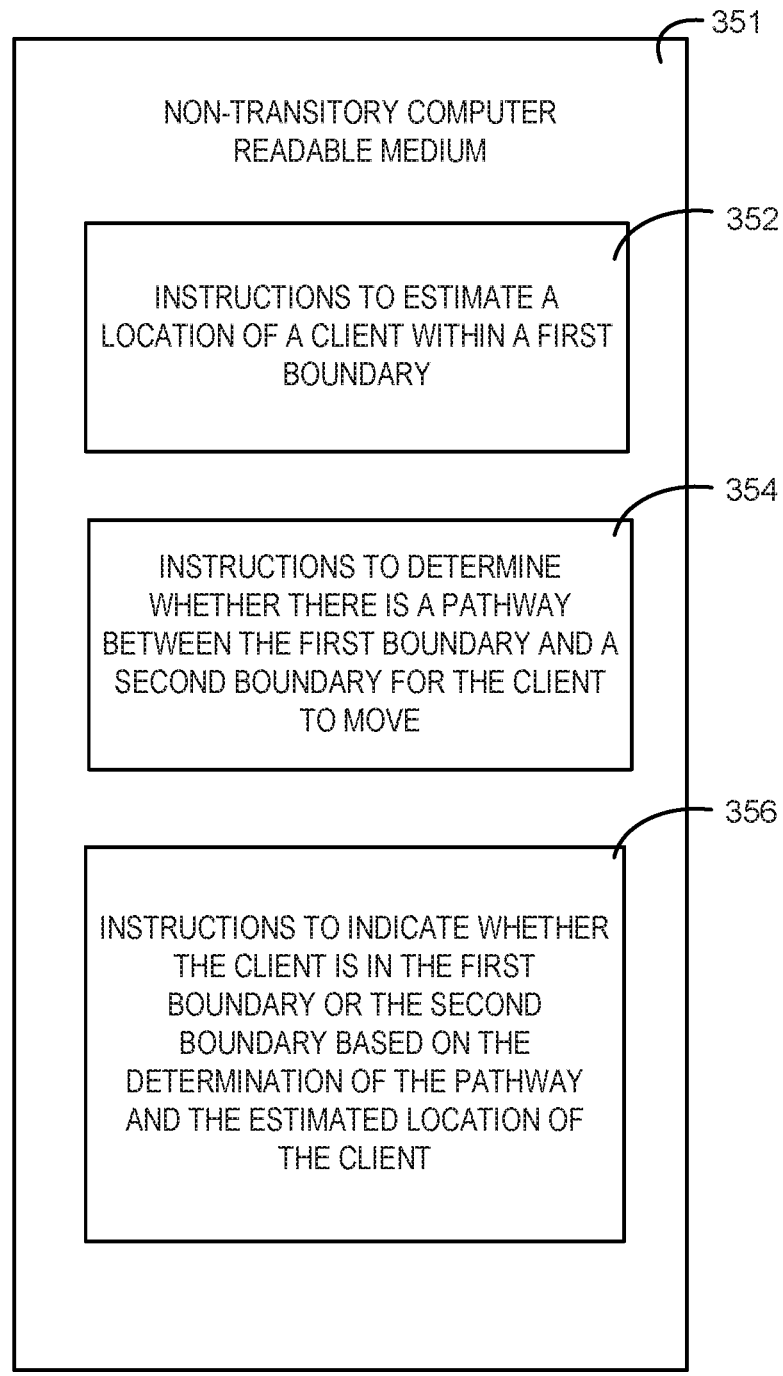
FIG. 3 is a block diagram of an example non-transitory computer readable medium for client boundary location consistent with the present disclosure.

In the illustrated example of FIG. 3, the client can be estimated to be in a location based on a direction that the client is moving. For example, as the client begins moving through the first movement 112-1, the client can be estimated to be located at the end of the first movement 112-1 as if the client had already completed the first movement 112-1. Likewise, the client can be estimated to be completing the second movement 112-2 as the client is moving through the second movement 112-2. And likewise, the client can be estimated to be completing the third movement 112-3 as the client is moving through the third movement 112-3.

This estimation can lead to estimating the client moving through a fourth movement 112-4, illustrated by dotted lines, based on the client moving through the third movement 112-3 in a direction that would be consistent with the client continuing to move through the fourth movement. This leads to an estimation that the client has moved from being located in GF1 110-1 to being in GF2 110-2. The estimation can lead to errors in locating the client. If the client is moving through the third movement 112-3 and stops at the intersection 112 of GF1 110-1 and GF2 110-2, the client could be incorrectly estimated to be located in GF2 110-2. In order to avoid this error, whether a pathway exists between GF1 110-1 and GF2 110-2 can be determined. As illustrated in FIG. 1, a pathway does not exist between GF1 110-2 and GF2 110-2 and would therefore lead to an error when estimating a location based on movement and a future location based on the direction of the movement.

Figure 2:
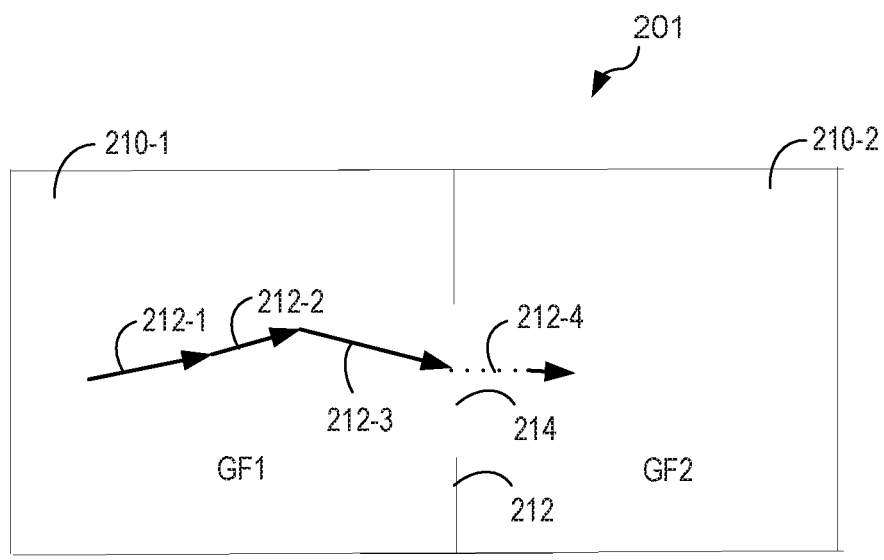
FIG. 2 illustrates an example network for client boundary location consistent with the present disclosure.

FIG. 2 illustrates an example network for client boundary location consistent with the present disclosure. As illustrated in FIG. 2, the network 201 may include a first geofence "GF1" 210-1 and a second geofence "GF2" 210-2. A geofence refers to a geographical boundary that is contained within a number of boundaries composing each side of the geographical boundary. A boundary intersection 212 is a boundary between the GF1 210-1 and the GF2 210-2. In contrast to FIG. 1, FIG. 2 illustrates a pathway 214 between GF 210-1 and GF2 210-2. A client can be located within at least one of the GF1 210-1 and the GF2 210-2. A first movement 212-1 of the client can be determined, as illustrated by the arrow labeled 212-1. A second movement 212-2 can be determined as beginning at a location where the first movement 212-1 ended and continuing to an end of the second movement 212-2. A third movement 212-3 can be determined as beginning at a location where the second movement 212-2 ended and continuing to an end of the third movement 212-3. In some examples, a current location of a client is estimated based on where movement of the client was last detected.

In the example in FIG. 2, as the client begins its third movement 212-3, a location estimation can include estimating that the client has passed into GF2 210-2 prior to the client actually physically moving into GF2 210-2. When this location estimation occurs, a determination that there is actually a pathway, such as pathway 214, that intersects GF1 210-1 and GF2 210-2 can be determined. The pathway determination can be based on prior client movements. For example, movements of a client while near an intersection 212 between two geofences, such as GF1 210-1 and GF2 210-2 can be recorded and/or saved. When the client moves from GF1 210-1 to GF2 210-2 and remains in GF2 210-2 for a predetermined amount of time, the client can be verified to have actually moved into GF2 210-2. Therefore, a pathway between GF1 210-1 and GF2 210-2 can be determined and recorded. The pathway can be as long or short, big or small, as any previous client movement indicates and is not limited to a full size of an intersection or a particular portion of an intersection (as illustrated in FIG. 2, the pathway between the intersection is only a portion of the intersection). As more client movement is recorded, the reliability of how many pathways are between two boundaries and/or the size of the pathways increases.

However, prior movements of a client near an intersection of two geofences that results in the client not passing from GF1 210-1 to GF2 210-2 can indicate that there is not a pathway. In response to a client not being previously recorded as passing from GF1 210-1 to GF2 210-2 at the intersection 212, a presumption that there is not a pathway can be recorded. This would effect the location determination during estimation where the client has not been verified as passing from GF1 210-1 to GF2 210-2 and merely moving toward GF2 210-2 near a boundary. In this situation, a client would be indicated as not crossing into GF2 210-2 until further location verification indicated that the client did actually move into GF2 210-2. When this occurs, an indication that a pathway exists would replace the indication that there has not previously been a pathway between the two geofences. In this way, a verification of the location estimation can be made based on prior client movement near an intersection.

In some examples, a map and/or boundary indications can be previously provided. The map and/or boundary indications can indicate where pathways exist between a number of geofences. In this way, when a client approaches an intersection between two geofences that does not include a pathway, the client will not be estimated as crossing from a first geofence to a second geofence along the intersection, e.g., will not be estimated as passing from GF1 210-1 to GF2 210-2. While an example of prior client movement and boundary indications being provided are given as examples, examples are not so limited. For example, any number of methods of indicating whether a pathway exists between two geofences that are located next to each other can be provided.

FIG. 3 is a block diagram of an example non-transitory computer readable medium 351 for client boundary location consistent with the present disclosure. A processing resource (not illustrated) may execute instructions stored on the non-transitory machine readable medium 351. The non-transitory machine readable medium 351 may be any type of volatile or non-volatile memory or storage, such as random access memory (RAM), flash memory, read-only memory (ROM), storage volumes, a hard disk, or a combination thereof.

The example medium 351 may store instructions 352 executable by a processing resource to estimate a location of a client within a first boundary (e.g., a geofence). In some examples, the location can be within the first boundary at a particular intersection between the first boundary (e.g., a first geofence) and a second boundary (e.g., a second geofence). A client can refer to a user, an access point, a router, a wireless device, etc.

In some examples, the example medium 351 may store instructions 354 executable by a processing resource to determine whether there is a pathway between the first boundary and the second boundary for the client to move. For example, a determination of whether there is a pathway can be based on prior client movement that indicates the client previously crossed over the boundary between the first boundary and the second boundary. In some examples, a determination of whether there is a pathway can be based on prior mapping input that indicates a layout of the first and the second boundaries.

In some examples, the example medium 351 may store instructions 356 executable by a processing resource to indicate whether the client is in the first boundary or the second boundary based on the determination of the pathway and the estimated location of the client. That is, in response to a determination that the pathway is between the first boundary and the second boundary, an estimation that the client is moving toward and/or across an intersection between the first boundary and the second boundary can be verified. When verified, the client can be indicated as passing into the second boundary. In some examples, the client can be indicated as passing into the second boundary when an indication that the client has left the first boundary is confirmed. In response to a determination that the pathway is not between the first boundary and the second boundary, an estimation that the client is moving toward and/or across the intersection can not be verified and the client can be indicated as still in the first boundary. Any estimated location information related to the client being located within the second boundary can be discarded and/or ignored. As used herein, information is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format such as a plurality of packets, frames, or cells.

The estimated location of the client can include a proximity of the client to an intersection between the first boundary and the second boundary. The estimated location of the client can include directional information indicating that the client was moving towards the second boundary from within the first boundary. In response to a determination that a pathway is between the first boundary and the second boundary and in response to the client being located in close proximity to the intersection, the estimated location of the client as being within the second boundary can be verified.

Figure 4:
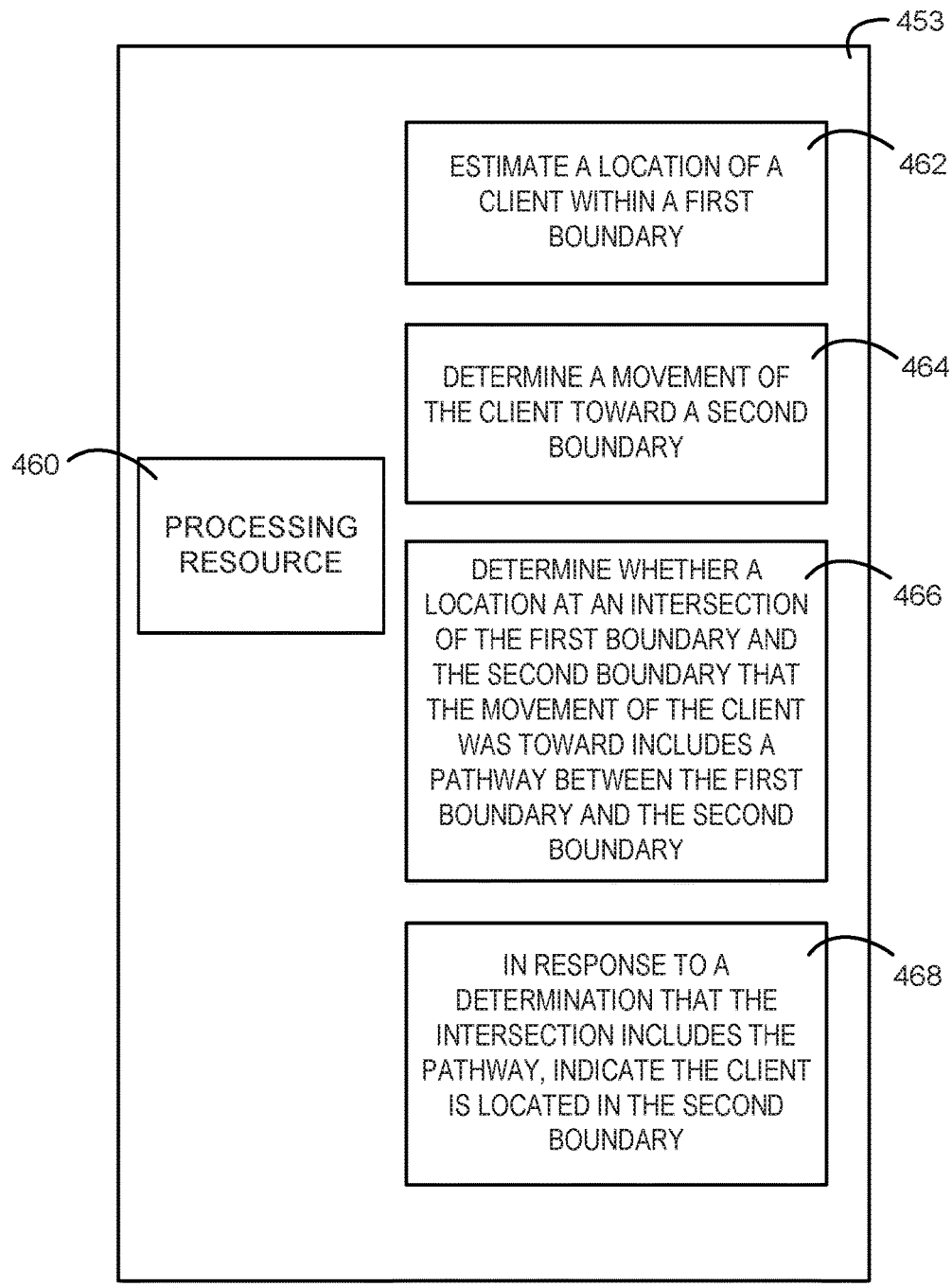
FIG. 4 is an example of an apparatus for client boundary location consistent with the present disclosure.

FIG. 4 is an example of an apparatus 453 for client boundary location consistent with the present disclosure. The apparatus 453 can include a processing resource 460 that may execute instructions stored on the non-transitory machine readable medium (not illustrated). While not illustrated, the non-transitory machine readable medium can be on the apparatus 453. The non-transitory machine readable medium may be any type of volatile or non-volatile memory or storage, such as random access memory (RAM), flash memory, read-only memory (ROM), storage volumes, a hard disk, or a combination thereof.

The example medium may store instructions 462 executable by a processing resource 460 to estimate a location of a client within a first boundary (e.g., a geofence). In some examples, the location can be within the first boundary at a particular intersection between the first boundary (e.g., a first geofence) and a second boundary (e.g., a second geofence). A client can refer to a user, an access point, a router, a wireless device, etc.

In some examples, the example medium may store instructions 464 executable by a processing resource 460 to determine a movement of the client toward a second boundary. For example, a change of location that indicates a closer proximity to the second boundary than a prior determined location can indicate that the client is moving toward the second boundary from within the first boundary. A progression of locations that are each increasingly closer in proximity to the second boundary can indicate the client is moving towards the second boundary.

In some examples, the example medium may store instructions 466 executable by a processing resource 460 to determine whether a location at an intersection of the first boundary and the second boundary that the movement of the client was toward includes a pathway between the first boundary and the second boundary. That is, in response to a determination that the intersection includes the pathway, an indication that the client can move from the first boundary to the second boundary can be verified. When verified, the client can be estimated as moving into the second boundary when the client's estimated location indicates the client has moved within the second boundary. The determination whether the intersection includes the pathway can be based on data indicating pathways between the first boundary and the second boundary. The determination whether the intersection includes the pathway can be performed by learning where the pathways are located between the first boundary and the second boundary. The learning to determine where the pathways are located can be based on prior client movements. The determination that a pathway is located between the first boundary and the second boundary can be in response to prior client movements that indicated that the client moved from within the first boundary to within the secondary boundary. A determination that there is not a pathway located between the first boundary and the second boundary can be in response to prior client movements that indicated that the client has not previously moved between the first boundary and the secondary boundary at the intersection.

The example medium may store instructions 468 executable by a processing resource 460 to, in response to a determination that the intersection includes the pathway, indicate the client is located in the second boundary. In response to a determination that the intersection does not include the pathway, the client can be indicated as still in the first boundary.

Figure 5:
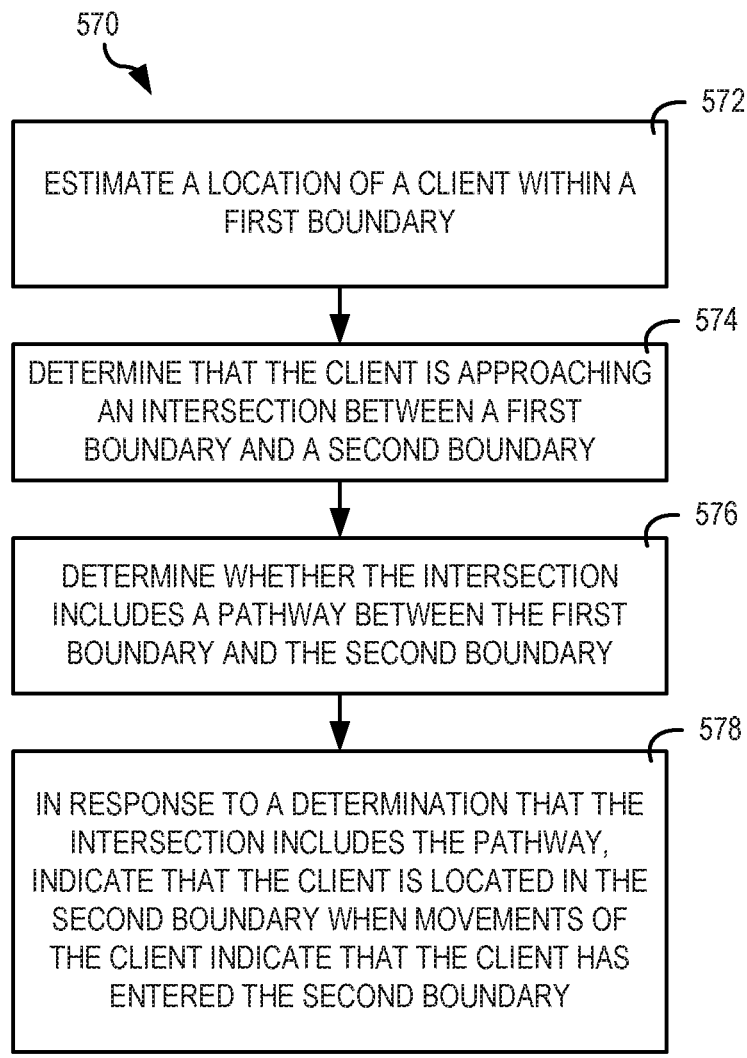
FIG. 5 illustrates an example method for client boundary location consistent with the present disclosure.

FIG. 5 illustrates a flow diagram for an example method 570 for neighboring network devices consistent with the present disclosure. At 572, the method 570 includes estimating a location of a client within a first boundary. At 574, the method 570 includes determining that the client is approaching an intersection between a first boundary and a second boundary. At 576, the method 570 includes determining whether the intersection includes a pathway between the first boundary and the second boundary. At 578, the method 570 includes in response to a determination that the intersection includes the pathway, indicating that the client is located in the second boundary when movements of the client indicate that the client has entered the second boundary.

In some examples, the method 570 includes, in response to a determination that the intersection does not include the pathway, indicating that the client is located in the first boundary. In some examples, the method 570 includes continuing to determine that the client is in the first boundary in response to the intersection not including the pathway and movements of the client indicating that the client is moving into the second boundary.

In some examples, the method can include determining a passerby event. The passerby event can be indicated for a second boundary when a client is in a first boundary and is located in a pathway zone (e.g., at an intersection between the two boundaries that includes a pathway). The method can include an OUT event for a client moving out of the first boundary and into the second boundary in response to: the client being in the first boundary and in the pathway zone; and the direction of subsequent movements of the client are changing and are away from the first boundary.

The method can include an IN event for a client moving from the first boundary toward the second boundary in response to: the client being in the first boundary and in the pathway zone; the direction of subsequent movements of the client are changing and in a direction of the second boundary; a latch time of the client in the second boundary is more than a particular predetermined time; and an OUT event is generated for the first boundary before generating an IN event for the second boundary. A latch time can refer to a time that the client remains in a particular location. In this way, the client can be verified as having moved from the first boundary to the second boundary.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designators "N", "M", "P", "R", "S", and "T", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

What is claimed is:

1. A non-transitory computer readable medium storing instructions executable by a processing resource to cause a computer to:
   estimate a location of a client within a first boundary;
   determine whether the client entered a second boundary based on prior client movements;
   determine whether there is a pathway between the first boundary and the second boundary for the client to move, based on the determination of whether the client entered the second boundary and remained within the second boundary for a predetermined amount of time; and
   indicate whether the client is in the first boundary or the second boundary based on:
   the determination of the pathway; and
   the estimated location of the client.

2. The medium of claim 1, wherein the instructions are executable to estimate the location of the client based on a determination that the client was moving from the first boundary toward the second boundary.

3. The medium of claim 1, wherein the instructions are executable to estimate a location of the client as being at an intersection of the first boundary and the second boundary.

4. The medium of claim 3, wherein the instructions are executable to indicate the client is in the first boundary in response to a determination that there is not a pathway between the first boundary and the second boundary.

5. The medium of claim 3, wherein the instructions are executable to indicate that client has moved into the second boundary in response to a determination that there is a pathway between the first boundary and the second boundary.

6. An apparatus, comprising a processing resource to execute instructions to:
   estimate a location of a client within a first boundary;
   determine movement of the client toward a second boundary;
   determine whether the client entered the second boundary and remained within the second boundary for a predetermined amount of time based on prior client movements;
   determine whether a location at an intersection of the first boundary and the second boundary includes a pathway between the first and second boundary based on the client having remained in the second boundary for the predetermined amount of time, wherein the movement of the client toward the second boundary includes movement toward the location; and
   in response to a determination that the intersection includes the pathway, indicate the client is located in the second boundary.

7. The apparatus of claim 6, wherein the processing resource is to, in response to a determination that the intersection does not include the pathway, indicate the client is located in the first boundary.

8. The apparatus of claim 6, wherein the processing resource is to determine whether the intersection includes the pathway based on data indicating pathways between the first boundary and the second boundary.

9. The apparatus of claim 6, wherein the processing resource is to determine whether the intersection includes the pathway by learning where the pathways are located between the first boundary and the second boundary.

10. The apparatus of claim 9, wherein the processing resource is to learn where the pathways are located based on prior client movements.

11. The apparatus of claim 10, wherein the processing resource is to determine that a pathway is located between the first boundary and the second boundary in response to the prior client movements indicating that the client moved from within the first boundary to within the secondary boundary.

12. The apparatus of claim 10, wherein the processing resource is to determine that there is not a pathway located between the first boundary and the second boundary in response to the prior client movements indicating that the client has not previously moved between the first boundary and the secondary boundary at the intersection.

13. A method, comprising:
estimating a location of a client within a first boundary;
determining whether the client entered a second boundary based on prior client movements;
determining that the client is approaching an intersection between the first boundary and the second boundary;
determining whether the intersection includes a pathway between the first boundary and the second boundary based on the determination of whether the client entered the second boundary and remained within the second boundary for a predetermined amount of time; and
in response to a determination that the intersection includes the pathway based on the client having remained in the second boundary for the predetermined amount of time, indicating that the client is located in the second boundary when movements of the client indicate that the client has entered the second boundary.

14. The method of claim 13, comprising, in response to a determination that the intersection does not include the pathway based on the client having not remained in the second boundary for the predetermined amount of time, indicating that the client is located in the first boundary.

15. The method of claim 14, comprising continuing to determine that the client is in the first boundary in response to:
the intersection not including the pathway; and movements of the client indicating that the client is moving into the second boundary.

* * * * *